US011119811B2

(12) United States Patent
Bernard et al.

(10) Patent No.: US 11,119,811 B2
(45) Date of Patent: Sep. 14, 2021

(54) INTERACTIVE DEVICE FOR DISPLAYING WEB PAGE DATA IN THREE DIMENSIONS

(71) Applicant: F4, Paris (FR)

(72) Inventors: Fabrice Bernard, Paris (FR); Ludovic Perrine, Gentilly (FR); Alexis Galley, Viroflay (FR); Jean-Marc Oury, Paris (FR); Bruno Heintz, Paris (FR)

(73) Assignee: F4, Paris (FR)

( * ) Notice: Subject to any disclaimer, the term of this patent is extended or adjusted under 35 U.S.C. 154(b) by 0 days.

(21) Appl. No.: 15/744,442

(22) PCT Filed: Jul. 7, 2016

(86) PCT No.: PCT/FR2016/051732
§ 371 (c)(1),
(2) Date: Jan. 12, 2018

(87) PCT Pub. No.: WO2017/009551
PCT Pub. Date: Jan. 19, 2017

(65) Prior Publication Data
US 2018/0217863 A1 Aug. 2, 2018

(30) Foreign Application Priority Data
Jul. 15, 2015 (FR) ...................................... 1556682

(51) Int. Cl.
*G06F 9/48* (2006.01)
*G06F 3/0481* (2013.01)
(Continued)

(52) U.S. Cl.
CPC ............... *G06F 9/48* (2013.01); *G01C 21/32* (2013.01); *G06F 3/04815* (2013.01);
(Continued)

(58) Field of Classification Search
None
See application file for complete search history.

(56) References Cited

U.S. PATENT DOCUMENTS 6,046,747 A     4/2000 Saunders et al.
6,885,367 B1 *  4/2005 Fujieda ................... G06T 19/00
                                                      345/420
(Continued)

FOREIGN PATENT DOCUMENTS

CA      2320721 A1      3/2002
EP      1453011 A1 *    9/2004  ............. G06T 15/00
(Continued)

OTHER PUBLICATIONS web.archive.org/web/20150707173159/https://en.wikipedia.org/wiki/Interpreter_(computing) (Year: 2015).*
(Continued)

*Primary Examiner* — Abu Zar Ghaffari
(74) *Attorney, Agent, or Firm* — McCarter & English, LLP

(57) ABSTRACT

An interactive device is provided including a user interface arranged to define at least one display request including at least localization and display data, a network interface for transmitting a Web page data request correlated with a display request, a memory to receive the Web page data including mapping and/or object data. The device includes a Web interpreter for displaying a Web page, a three dimensional ("3D") engine for calculating three-dimensional display data, and a display engine for displaying Web page data in three dimensions. The Web interpreter includes a driver operating in execution cycles for determining a list including at least one operation that may be a request for object and/or mapping data or processing by the 3D engine or the display engine of the received data, the driver executing the opera-
(Continued)

tion(s) according to the order of the operations, the number of requests, and the duration of the execution cycle.

7 Claims, 1 Drawing Sheet

(51) Int. Cl.
  *G06T 15/00*  (2011.01)
  *G01C 21/32*  (2006.01)
  *G06F 16/9537*  (2019.01)
  *G06T 17/00*  (2006.01)
  *G01C 21/36*  (2006.01)

(52) U.S. Cl.
  CPC ........ *G06F 9/4881* (2013.01); *G06F 16/9537* (2019.01); *G06T 15/005* (2013.01); *G06T 17/00* (2013.01); *G01C 21/3638* (2013.01)

(56) References Cited

U.S. PATENT DOCUMENTS

| | | | |
|---|---|---|---|
| 7,570,261 B1* | 8/2009 | Edecker | G06Q 20/102 345/420 |
| 7,752,534 B2* | 7/2010 | Blanchard, III | G06F 40/12 715/204 |
| 8,314,790 B1* | 11/2012 | Zeiger | G06T 17/00 345/419 |
| 8,626,750 B2* | 1/2014 | Mandel | G06F 3/04815 707/722 |
| 8,941,642 B2* | 1/2015 | Tadaishi | G06T 17/00 345/419 |
| 9,720,555 B2* | 8/2017 | Sorden | H04W 4/30 |
| 2003/0197737 A1* | 10/2003 | Kim | G06F 16/954 715/781 |
| 2004/0239679 A1* | 12/2004 | Ito | G06T 15/00 345/555 |
| 2005/0270311 A1 | 12/2005 | Rasmussen et al. | |
| 2006/0170693 A1 | 8/2006 | Bethune et al. | |
| 2007/0070066 A1* | 3/2007 | Bakhash | G06F 3/04815 345/419 |
| 2008/0109159 A1 | 5/2008 | Shi et al. | |
| 2008/0306709 A1* | 12/2008 | Fisker | G06T 17/00 702/167 |
| 2009/0157630 A1* | 6/2009 | Yuan | G06Q 10/101 |
| 2010/0284594 A1* | 11/2010 | Hohne | G06T 19/20 382/131 |
| 2011/0072369 A1* | 3/2011 | Choi | G06F 3/0489 715/760 |
| 2011/0161843 A1* | 6/2011 | Bennett | G09G 3/20 715/760 |
| 2012/0271848 A1 | 10/2012 | Kadowaki et al. | |
| 2013/0007575 A1 | 1/2013 | Bacus et al. | |
| 2013/0024764 A1* | 1/2013 | Lou | G06T 19/00 715/234 |
| 2013/0044260 A1 | 2/2013 | Vestergaard et al. | |
| 2013/0054695 A1* | 2/2013 | Holman | G09B 19/00 709/204 |
| 2013/0076784 A1 | 3/2013 | Maurer et al. | |
| 2013/0091452 A1* | 4/2013 | Sorden | G06F 3/048 715/771 |
| 2013/0132466 A1* | 5/2013 | Miller | H04L 67/02 709/203 |
| 2013/0155053 A1* | 6/2013 | Beck | G09G 5/006 345/419 |
| 2013/0241926 A1* | 9/2013 | Asaria | G06Q 10/00 345/419 |
| 2013/0321400 A1 | 12/2013 | van Os et al. | |
| 2014/0071119 A1 | 3/2014 | Piemonte et al. | |
| 2014/0157315 A1 | 6/2014 | He et al. | |
| 2015/0082181 A1* | 3/2015 | Ames | G06F 3/04815 715/738 |
| 2015/0091906 A1* | 4/2015 | Dishno | G06F 16/9577 345/427 |
| 2015/0135114 A1 | 5/2015 | Zhang et al. | |
| 2015/0161823 A1* | 6/2015 | Anderson-Sprecher | G06T 15/005 345/419 |
| 2015/0170397 A1* | 6/2015 | Han | H04N 13/275 345/419 |
| 2015/0220244 A1* | 8/2015 | Vats | G06F 3/04815 715/850 |
| 2018/0217863 A1* | 8/2018 | Bernard | G06F 9/48 |
| 2018/0322143 A1 | 11/2018 | Bernard et al. | |
| 2019/0073431 A1 | 3/2019 | Hellot et al. | |

FOREIGN PATENT DOCUMENTS

| | | | | |
|---|---|---|---|---|
| EP | 1453011 A1 | 9/2004 | | |
| EP | 1657682 A2 | 5/2006 | | |
| EP | 2595118 A2 | 5/2013 | | |
| EP | 2780826 A1 * | 9/2014 | ............ | G06T 19/00 |
| WO | 01/59540 A2 | 8/2001 | | |
| WO | 01/84501 A2 | 11/2001 | | |

OTHER PUBLICATIONS

International Search Report of the International Searching Authority, along with its English translation, dated Sep. 5, 2016, issued in connection with International Application No. PCT/FR2016/051532 (7 pages).
Written Opinion of the International Searching Authority dated Sep. 5, 2016, issued in connection with International Application No. PCT/FR2016/051532 (7 pages).
International Search Report of the International Searching Authority, along with its English translation, dated Dec. 14, 2016, issued in connection with International Application No. PCT/FR2016/052616 (8 pages).
Written Opinion of the International Searching Authority, dated Dec. 14, 2016, issued in connection with International Application No. PCT/FR2016/052616 (6 pages).
International Search Report of the International Searching Authority, along with its English translation, dated Oct. 6, 2016, issued in connection with International Application No. PCT/FR2016/051732 (5 pages).
Written Opinion of the International Searching Authority dated Oct. 6, 2016, issued in connection with International Application No. PCT/FR2016/051732 (6 pages).
Office Action dated Oct. 16, 2019, issued in connection with U.S. Appl. No. 15/767,202 (24 pages).
Office Action dated Mar. 29, 2019, issued in connection with U.S. Appl. No. 15/739,479 (10 pages).
Limberger, et al., "Interactive Software Maps for Web-Based Source Code Analysis," Web3D 2013, Jun. 20-22, 2013 (8 pages).
Notice of Allowance dated Nov. 16, 2020, issued in connection with U.S. Appl. No. 15/767,202 (8 pages).
Office Action dated May 12, 2020, issued in connection with U.S. Appl. No. 15/767,202 (30 pages).
Office Action dated Sep. 23, 2020, issued in connection with U.S. Appl. No. 15/767,202 (25 pages).

* cited by examiner

INTERACTIVE DEVICE FOR DISPLAYING WEB PAGE DATA IN THREE DIMENSIONS

RELATED APPLICATIONS

This application is a U.S. National Phase Application under 35 U.S.C. 371 of International Application No. PCT/FR2016/051732 filed Jul. 7, 2016, which claims the benefit of French Patent Application No. 1556682 filed on Jul. 15, 2015. The disclosures of these applications are expressly incorporated herein by reference in their entireties.

BACKGROUND

The invention relates to the field of Web devices, and in particular to devices allowing interaction. More particularly, the invention relates to the field of mapping over the Internet.

Mapping over the Internet has for a long time been limited to the reproduction of paper maps in the form of images. This was inaccurate and consumed a great deal of bandwidth, and posed problems of relevance, since the images offered no simple means of scaling or of personalization.

Significant parties to the new technologies have modified this situation by proposing maps over the Internet that were lighter, whose scaling is adaptive, and that allow the user to rapidly traverse a given map. Note that, like the invention, these solutions are all of "pure Web" type, that is to say that a Web client (a browser or a smartphone application) interacts with a server to obtain the data, but stores nothing locally, outside of the cache. All the data originate from the server, in real time except for the data of the cache. This is crucial since, having regard to currently available bandwidths, the constraints on what it is possible to obtain in terms of visual effects are very strong if it is desired to maintain a fluid display.

These same parties have added onto these maps layers of information so as to add a little information, such as the site of certain businesses or monuments, etc. However, these are literally layers in the graphical sense of the term: the nature of the interaction is limited to the display of a text, the clickable area allowing this interaction is limited to an area of reduced size chosen in an arbitrary manner, and cannot for example relate to an entire property, or a park in a town. Efforts have also been made to afford a little realism by adding a three-dimensional view for certain buildings. But here again, these are purely graphical elements, devoid of interaction.

SUMMARY

In response to these problems, the Applicant has developed a device and a method having formed the subject of application FR 1555807. This type of device, like others when Web resources are called upon intensely (which is often the case when 3D is envisaged), is very demanding in terms of resources, and the optimization of user experience is complex if it is desired to exploit it to the maximum.

The invention aims to improve the situation. For this purpose, the invention proposes an interactive device comprising a user interface designed to define at least one display request comprising at least location data and display data, a network interface designed to issue a Web page data request in correspondence with a display request, a memory for receiving corresponding Web page data, the Web page data comprising mapping data and/or object data.

The device furthermore comprises a Web interpreter designed to allow the display of a Web page and comprising a three dimensional ("3D") engine designed to calculate display data in three dimensions on the basis of object data and a display engine designed to make it possible to display Web page data on the basis of mapping data and/or of display data in three dimensions. The Web interpreter furthermore comprises a manager operating by execution cycle and designed to determine a list comprising at least one operation that may be a request for object data and/or for mapping data or a processing by the 3D engine or the engine for display of data received, the manager executing the operation or operations of the list of a given execution cycle as a function of the order of the operations in the list, of the number of requests in progress, and of the duration of given execution cycle.

This device is particularly advantageous since it makes it possible to execute in Web mode a program calling very numerous objects while safeguarding user experience.

According to diverse variants, the device can exhibit one or more of the following characteristics:
- the manager executes the operations according to their order in the list,
- the manager executes a data request when the number of data requests currently executing is less than a threshold number of requests,
- the manager seeks to execute the operations of data requests before the processing operations,
- the manager determines between the execution of two operations whether a duration between the current time and the time of the next execution cycle is greater than a threshold temporal value, and ceases to run through the list of operations if appropriate,
- the manager determines several lists exhibiting a priority rank, and executes the operations of the lists by decreasing priority rank,
- the manager executes the operations of a list of lower priority rank when all the processing operations of the list of immediately higher priority rank have been executed.

The invention also relates to a computer program product comprising program code portions for implementing the interactive device when said program is executed on a computer.

BRIEF DESCRIPTION OF THE DRAWINGS

Other characteristics and advantages of the invention will become better apparent on reading the description which follows, derived from examples given by way of nonlimiting illustration and derived from the drawings in which.

DETAILED DESCRIPTION

The drawings and the description hereinafter contain, in essence, elements of definite character. They will therefore be able not only to serve to better elucidate the present invention, but also to contribute to its definition, if appropriate.

The present description is of a nature such as to involve elements susceptible to protection by author's rights and/or copyright. The owner of the rights has no objection to the identical reproduction by anyone of the present patent document or of its description, such as it appears in the official dossiers. As for the rest, he fully reserves his rights.

Figure 1:
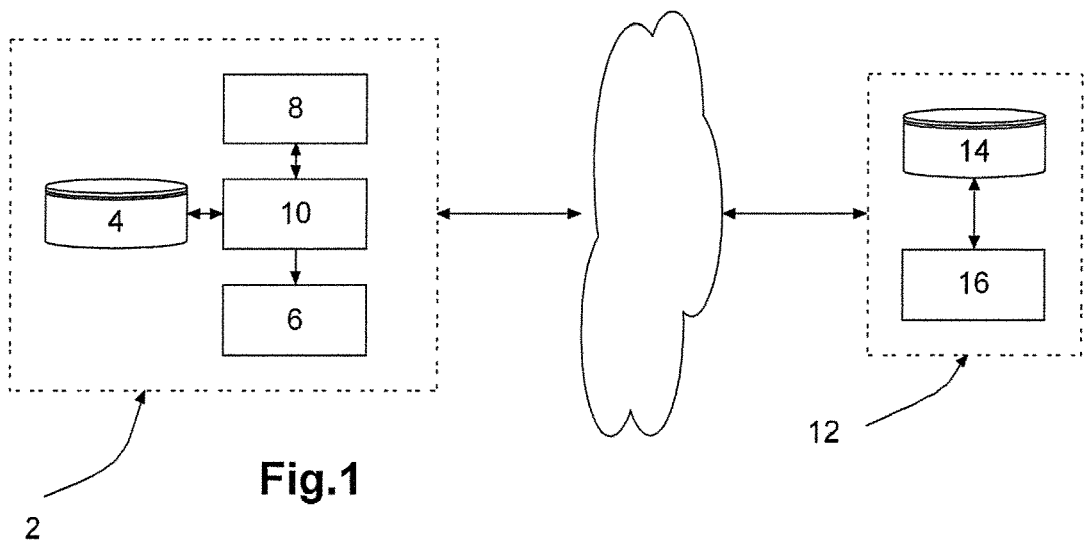
FIG. 1 represents a schematic diagram of a device according to the invention, in its operating environment.

FIG. 1 represents a generic diagram of an interactive device 2 according to the invention in its environment.

The example described here finds a particularly beneficial application in the field of on-line mapping. However, the invention finds its application in any situation involving a display in three dimensions involving interactivity with the user in an "any server", or "any streaming", context, that is to say that all the data arise from a server, the device storing nothing locally (including the JavaScript code of the 3D engine in the example described here) apart from the cache. This application is particularly suitable for Web use, but will be able to be used in application form for smartphones for example, in a format other than a Web page. In this case, the application will be able to store the code data of the 3D engine for example, but will still not aim at storing other data than the cache, that is to say that the data stored do not persist.

The device 2 comprises a memory 4, a display 6, a user interface 8, a network interface (not represented) and a Web interpreter 10.

The memory 4 can be any means for storing information: Flash memory, RAM memory, a hard disk, a connection to remote storage or in the cloud, etc. Within the framework of the invention, the memory 4 serves to store the data with a view to processing. As mentioned above, it is not intended that the data of the memory 4 should persist, except to serve as cache whose duration of validity is programmed and limited. Indeed, the invention envisages a real-time application where all the data are obtained from the server, without prior local storage.

The display 6 can be any conventional display of the screen, video projector, projection glasses type, etc. The user interface 8 allows the user of the device 2 to choose the map display parameters as well as the site that he wishes to view.

The display parameters may pertain in a non-restrictive manner to the latitude and the longitude, the zoom level, the angle of the view, the orientation. These parameters are conventional in this type of application. The invention also proposes other, so-called "personalization", display parameters.

Indeed, in the known applications, it is possible to activate or to deactivate the display of certain elements. However, this entails only displaying or not displaying the corresponding information layers. It does not entail making it possible to personalize the display of a restricted assembly of objects, for example. Besides, it is not possible to speak of "objects" in the prior art applications. These entail simple mappings, optionally furnished with three-dimensional displays, but not customizable. On the contrary, the invention makes it possible to render each element of the mapping independent, as computerized object.

The Web interpreter 10 can be effected by any browser implementing HTML, JavaScript and WebGL. As will be seen in what follows, the Web interpreter 10 comprises a three dimensional ("3D") engine, a display engine, a WebGL interpreter and a manager (none of which is represented). In the example described here, the user accesses the mapping by way of a Web page. This Web page contains at one and the same time HTML code, JavaScript code and WebGL code. The JavaScript code defines the 3D engine, which receives object data to be represented on the map portion requested by the user, and transforms these object data into face data. The face data are transmitted to the WebGL interpreter which interacts with the hardware resources of the device 2 to calculate the data to be displayed properly speaking. The display properly speaking is managed by the display engine of the Web interpreter, on the basis of the data of mappings received and of the three-dimensional display data calculated, as will be seen below. The manager schedules all the operations, as will be described with reference to FIG. 3.

Although in the example described here the Web interpreter 10 uses WebGL for the rendition of the objects in three dimensions, the WebGL interpreter is optional and can be replaced with any other appropriate technology. In a general manner, it must be understood that the 3D engine controls the necessary actions in coordination with the manager so as to calculate the display data in three dimensions, the display engine being solely in charge of the display.

As mentioned previously, all the data are obtained from a server 12 which comprises a memory 14 and an engine 16. The memory 14 is similar to the memory 4, except in that it stores all the information useful to the operation of the device 2 (in contradistinction to the memory 4 which stores almost exclusively the cache).

The engine 16 is an element which receives the Web page data requests of the device 2. As was seen above, on the basis of the data received by the user interface 8, the device 2 defines a request for mapping display on the basis of the location data and of the display data. These data together define a geographical area. On the basis of this geographical area, the device 2 issues a request for Web page data to the server 12, and the engine 16 selects from the memory 14 the mapping data as well as the data of the objects which correspond to this request.

In the example described here, the mapping data of the memory 14 are stored in the form of tiles as several levels of details. Thus, each tile is decomposed into four sub-tiles when the zoom level increases, and vice versa, etc. In the example described here, the mapping data contain for each tile the list of the objects which are associated therewith. As a variant, the data of objects could contain data indicating the tiles to which they are tied.

In the example described here, the identification of the tiles is implicit, that is to say that the device 2 can determine which tile data the server 12 is to be asked for via the Web page data request. Thus, the latter is a pure request for resources, and the server 12 does not develop any "intelligence". As a variant, the Web page data request could be more abstract and contain the location data and the display data, and the server 12 would take charge via the engine 16 of determining the relevant tile data.

The data of the objects comprise, in the example described here, data making it possible to define in an abstract manner the three-dimensional display of these objects. Thus, for a building, the object data comprise data defining the footprint, the shape of its roof, and building height data. A building may exhibit several heights. Thus, when the 3D engine calculates the face data of a building, it proceeds by "raising" a contour corresponding to the footprint of the building to the height of the corresponding object data, and by calculating the triangles defining each of the faces of the thus-defined object. Another way of seeing this is to consider that a building is "extruded" through its footprint over its height. For a ground or a relief, one proceeds in a similar manner: on the basis of the tiles of the mapping data, a mesh of the ground is produced by triangulation. This mesh can be used to represent reliefs by virtue of object data of relief data type, which comprise location data making it possible to indicate the tile to which they correspond, and altitude data for indicating the height of the relief. When relief data are received, the vertices of the triangles of the tiles corresponding to the corresponding location data are raised to the height designated by the corresponding altitude data. The objects may also be intangible, and designate for example a bus line or subway line, or a water or electricity distribution network etc.

Advantageously, but optionally, as a function of the Web page data request, the engine 16 can select the data of objects as a function of a value indicating their size. Thus, if the zoom is very distant, the engine 16 returns only the details whose size is relevant having regard to the resolution of the map reproduced. And as soon as a user zooms, the engine 16 will dispatch the object data whose size has rendered them relevant having regard to the resolution sought. This presents the advantage of making it possible to control the device side downloading and processing load, and also to improve the visual experience: as a user zooms, the world becomes clearer before their eyes.

Figure 2:
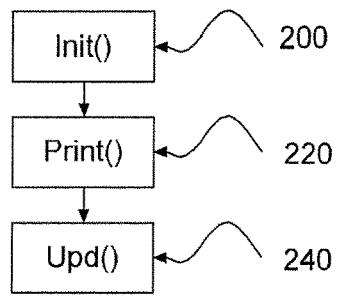
FIG. 2 represents a schematic diagram of an operating loop of the device of FIG. 1.

FIG. 2 represents a schematic diagram of an operating loop of the device of FIG. 1.

In an operation 200, the device 2 carries out the initialization of the display of the mapping. Accordingly, the location data and the display parameters are obtained on the basis of the user interface 8, and the device 2 implements the network interface so as to issue a display request to the server 12 with these data. In response, the server 12 issues data comprising the code of the 3D engine, as well as the mapping data and the corresponding object data. In the following exchanges, the code of the 3D engine is no longer transmitted, except for possible updates.

In an operation 220, the device 2 receives the mapping data and the object data, as well as the code of the 3D engine. On the basis of these data, the Web interpreter 10 displays for example by priority the mapping data, which give the user a rapid view of the "map background". At the same time, the 3D engine processes the object data to calculate the corresponding face data. The face data of each object are grouped together, and input into a face data block, by means of a memory block of 32-bit value array (or "Float32Array") type used by the WebGL interface, hereinafter Buffer32. The Buffer32 is a conventional tool in WebGL which serves to transmit a request to calculate 3D display data to a hardware resource on the basis of face data defined in the Buffer32. The WebGL interpreter transmits the Buffer32 containing all the face data to the hardware resource of the device 2 for calculation of the data for three-dimensional display of the object data. Each Buffer32 can contain data relating to 65536 vertices of triangles. When a Buffer32 is "full", the 3D engine instantiates another one, while safeguarding the correspondences between the data of each Buffer32 and the objects to which they correspond. As a variant, the Buffer32 could be effected with another type of array of values. The face data can comprise data defining vertices, faces, or else texture mapping information about the triangles.

Simultaneously, the Web interpreter 10 preserves a correspondence between the face data grouped together for each object of the Buffer32 and the identifiers of the corresponding objects. Thus, if a user wants to select an object, he clicks with the mouse on a site of the latter on the screen (or some other means for designating a site on the screen such as the JavaScript "onMouseOver" event). In response, the WebGL interpreter issues a "ray picking" type request, which returns the face, in the Buffer32, which has been designated by the click, and, on the basis of this correspondence, the Web interpreter 10 is capable of knowing which object has been clicked or designated, and of offering the user a menu of options for making requests specific to this object or to a class of objects corresponding thereto from the server 12, or else displaying this object in a particular manner. As a variant, schemes other than ray picking could be used to determine the face which lies under the mouse (for example the rendition at a single point of the scene with coloring of the faces on the basis of their identifier and identification of the face on the basis of the color of this point).

This characteristic is fundamental for two reasons:
the concatenation of a considerable assembly of face data in a few Buffer32s makes it possible to carry out display of a large quantity of objects without losing in terms of fluidity; and
the maintaining of the correspondence between the objects and the face data corresponding to them in the face data block makes it possible to render the objects actually interactive.

Before, the purported "objects" were dot-like points, or un-clickable images in three dimensions. In the case of points, it was difficult to click, and the clickable area was unrelated to the object concerned. Moreover, on account of the associated "superposed data layer" approach, the idea was not to render the objects interactive, but to add a simplistic information layer.

By contrast, the invention makes it possible to produce a new type of map in which the interaction is possible and intuitive: if it is desired to acquire information about a subway line or about a building, or about the vegetation of a street, it suffices to click anywhere on the corresponding object.

In existing maps, the majority of the details were omitted for the sole reason that they represented a mass of information that was impossible to process in a block without excessively slowing the downloading and/or the display. By virtue of the changeover to the "object" context, the details themselves are objects. It is therefore possible to choose the priority for displaying the objects, the most precise or "least useful" details being able to be displayed last, or not being displayed at all.

Moreover, transforming the map from a collection of juxtaposed map background tiles into a world composed of individual objects generates a significant amount of new applications that were not able to be envisioned previously. For example, it becomes possible to implement building or geolocation applications that provide quick and relevant information. In the latter case, it is possible to imagine that a click on a hospital will make it possible to ascertain the specialisms that are practiced there, or else that a click on a particular building will indicate what particular care is provided and/or the rooms for the service(s) in question, to click on a particular bench to indicate that it has been vandalized, etc. And the other surrounding details may be prioritized in a lower manner so as to preserve the user experience by providing said user with information that is of primary interest to him. It therefore becomes possible to introduce an enormous quantity of "layers of information" in a simple manner into maps, this previously having been impossible or inconvenient owing to the use of "layers" that were superposed and not directly linked to individualized objects.

Finally, in an operation 240, the device 2 updates the display 6 depending on the user inputs via the user interface 8. Thus, if the user changes zoom level, moves the map or interacts with one of the objects, the Web interpreter 10 calls the server 12 to obtain new data and calculates the modified data accordingly.

Figure 3:
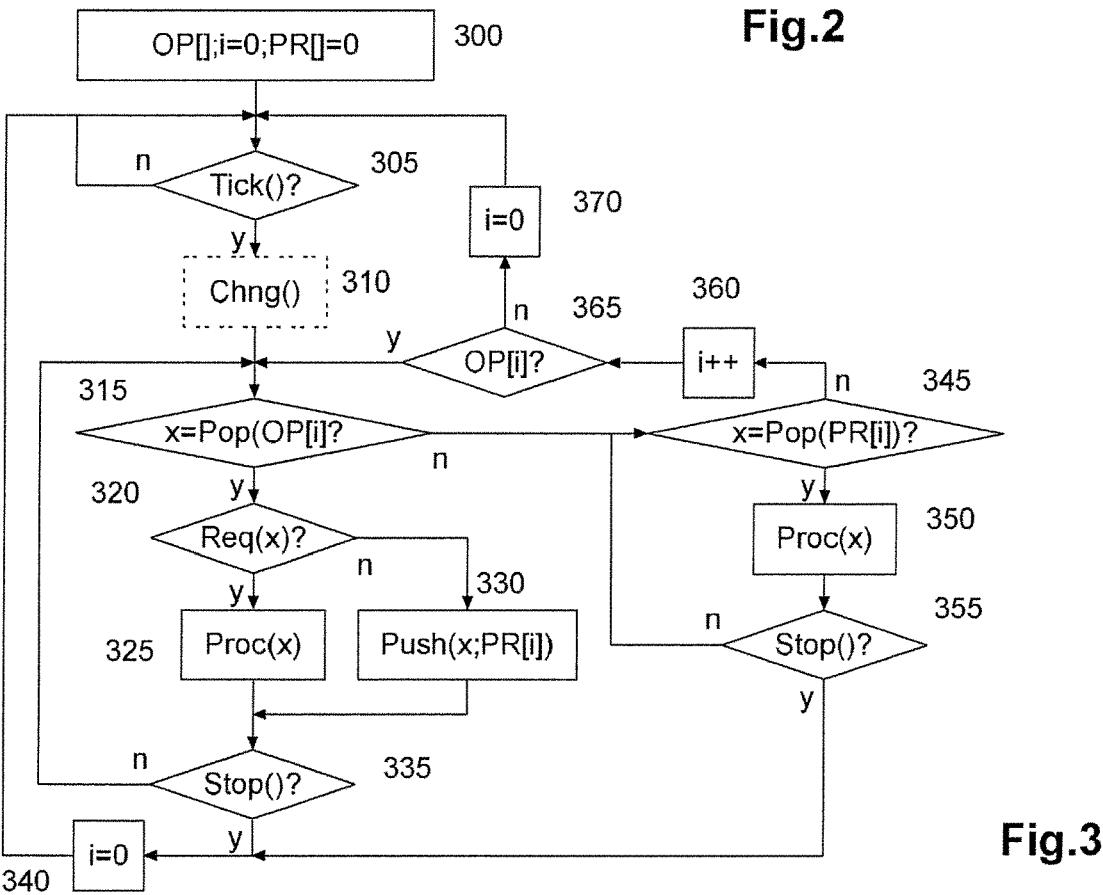
FIG. 3 represents a schematic diagram of an updating operation of FIG. 2.

FIG. 3 represents an exemplary implementation of the operations 220 and 240. Indeed, the device of the invention makes it possible to display a world exhibiting unequalled richness. As has just been seen, this richness is in part rendered possible by carrying out calculations on the device, for example to calculate the face data of the objects.

Despite all the optimizations offered by the invention, it goes without saying that, if the device waits to have all the data in order to display the map, both on initialization and during a significant change of position, the display delay risks being very significant, and the user experience will suffer thereby.

This is all the more significant as Web browsers and other devices having a Web interpreter embedded on board are limited in the number of simultaneous requests that they are capable of issuing. Indeed, they can in general issue between 25 and 50 requests to obtain Web page data simultaneously, yet without this number being known or standardized.

When considering this limitation in the light of the device described hereinabove, it becomes apparent fairly rapidly that, at least in the map initialization phase, the device will rapidly saturate the number of Web page data requests, and that this saturation will depend on a factor which cannot be controlled. A solution must therefore be found to make it possible to preserve good user experience in a complex environment like that of the device described hereinabove, which calls upon very numerous Web resources.

Accordingly, the Applicant has developed the manager of the Web interpreter. This manager has a role of scheduling the operations so as to optimize user experience. In the example which is described here, it is considered that a display with 60 images per second is optimal, and the manager is optimized in this sense. In other variants, according to other criteria, the manager could be designed differently.

The manager therefore organizes the operations within the Web interpreter. Accordingly, it manages two types of operations: data requests, and data processings.

The data requests are any request for Web page data, whether said request relates to mapping data or object data or data in respect of updating of the code of the 3D engine. In a general manner, these requests may therefore be seen as any exchange between the device and the exterior, and therefore they may saturate as explained above.

Conversely, the data processings relate to all the operations which are internal to the device, such as for example, the triangulation of objects data to obtain face data, their arranging as face block data, the transmission of face block data to the WebGL interpreter for the calculation of the three-dimensional display data, etc.

It must also be understood that the data requests and the data processings are not independent: a data processing is directly or indirectly linked to a data request which has been completed.

The device therefore operates by execution cycles. Within a given execution cycle, the manager determines the list of the operations that are "in progress", that is to say to be carried out, and chooses those of these operations which will be executed for this cycle. The downloading of new data is carried out by priority, since it is these data which once downloaded are processed so as to be displayed. This is all the more important as, though the data processing time is relatively predictable (since it is dependent on local resources), the downloading times are less so (the networks possibly exhibiting uncontrollable latency).

In principle, for a given execution cycle, the manager will launch by priority the newly generated data requests and the data requests that were not launched in the previous cycle or cycles. Thereafter, once all the possible downloads have been launched, the manager allocates some time to the processing operations. In the example described here, the situation is slightly more complex still, since the manager will manage several lists of operations as a function of their priority. For example, an operation pertaining to a map background tile will have priority over a detail operation. Accordingly, the manager manages several lists, which it seeks to empty one after the other. Thus, the manager will firstly launch all the data requests of the first list (to the extent that is possible simultaneously), and then all the data processings of the first list, and then once it has exhausted this first list, it will pass to the second list etc.

The manager therefore starts for a given cycle from an operation 300 on the basis of an array of operations (request or processing) to be executed OP[ ], of a list priority index i initialized to 0, and an array of processings to be executed PR[ ] which is likewise initialized to 0.

In an operation 305, a function Tick( ) verifies whether a new execution cycle is so close that no new operation can be launched. If such is the case, then the operation 305 is repeated until new cycle begins.

If such is not the case, then in an optional operation 310, the manager can take account of external events so as to modify its operation with a function Chng( ).

For example, if the user begins to move speedily in the map, the manager will be able to change the lists regarding priority (for example, no longer load the details, give greater priority to tile data that were previously at the image edge and that become central having regard to the movement), abandon certain operations that are no longer relevant (for example, a request for a tile that will no longer be displayed having regard to the direction of movement), modify the cycle duration to take account of information entered by the user (that may favor more details or on the contrary favor perfect fluidity, etc.), etc.

Thereafter, two loops begin in which the array of operations OP[ ] of index i will be progressively popped so as to launch the execution of the data requests (first loop), before launching the execution of the data processings (second loop). In what follows, we shall speak interchangeably of array OP[ ] of index i or of list OP[i], the array being just one way of implementing the different lists of priorities. When these two loops have terminated without the execution cycle terminating, the operation 305 resumes with the next priority list.

The first loop begins with an operation 315 by popping a current operation x from the list OP[i]. In an operation 320, a function Req( ) determines whether the operation x is a request, and whether or not the maximum number of simultaneous requests is reached.

If it is a request and if the number of simultaneous requests is not reached, then in an operation 325, a function Proc( ) launches the execution of the data request. As soon as the downloading of the corresponding data is carried out, the Web interpreter modifies the list of operations accordingly so as to introduce a processing operation on data which relate to the downloaded data.

If it is not a request, or if the number of simultaneous requests is reached, then in an operation 330, the manager executes a function Push( ) which analyzes the operation x and, if it is a data processing, introduces it into the list PR[i] of processings to be performed. If it is a request and if the number of simultaneous requests is not reached, then the function Push( ) moves the operation x in the list of operations to be processed in the next execution cycle.

Finally, after the operation 325 or the operation 330, a function Stop( ) 335 determines whether or not the manager can still initialize new tasks. If such is not the case, then the index i is reinitialized to 0 in an operation 340, and the next execution cycle is awaited with the operation 305. If such is the case, then the first loop resumes with the operation 320 to pop the following operation from the priority list of index i.

When the list of operations of index i (OP[i]) is empty, the second loop begins. In this second loop, the list PR[i] will be popped so as to execute the processing operations, in a similar manner to the first loop, but it is simpler since by construction, the list PR[i] contains only processing operations.

Thus, in an operation 345, the list PR[i] is popped, and in an operation 350, the function Proc( ) is again called to execute the current processing x. Accordingly, the Web interpreter instantiates a Web Worker, which is a Javascript component which makes it possible to profit from the multi-core architecture of modern processors. As a variant, the Web interpreter can operate without a Web Worker.

Thereafter, in an operation 355, the function Stop( ) is relaunched in the same way as the operation 335. When the operation 335 indicates an end of execution cycle the second loop terminates with the operation 340 and then standby awaiting the following execution cycle with the operation 305. Otherwise, the second loop continues with the operation 345 until the list PR[i] is empty or until the function Stop( ) indicates an end of execution cycle.

When the list PR[i] is empty, then the manager can pass to the following priority list, by incrementing the index i in an operation 360, and by verifying on the list of index i exists in an operation 365. If such is the case, then the execution cycle continues with the first operation 320 of the first loop of the new priority list. Otherwise, the index i is reinitialized to 0 in an operation 370, and the next execution cycle is awaited with the operation 305.

The mode of operation described with FIG. 3 is particularly beneficial since it makes it possible to keep the lists of operations permanently updated from one execution cycle to the next. When a new operation is introduced, the Web interpreter transmits it to the manager which receives it in one of the prioritization lists and executes it as quickly as possible.

Moreover, operating in this way ensures that display is as fast as possible: the display engine does not wait until all the data have arrived to begin displaying the map. By the very nature of the prioritization, the most important data will be received first and displayed as soon as possible. Thus, the world is constructed under the eyes of the user.

For example, for use in the property sector:
List 0 (maximum priority): the locations of property or premises, since it is more important for the user to see that there are premises which correspond to his search criteria somewhere on the map than to be able to get his bearings,
List 1: the map background, since it allows the user to get his bearings,
List 2: information defining the relief of the terrain and the buildings,
List 3: trees, fountains, vines, cemeteries, etc.

As a variant, there may be just a single prioritization list. As mentioned previously, the priority of certain elements and/or their inclusion in the prioritization lists might depend on their nature. For example, objects of "details" type might not be displayed when the zoom indicates too significant a distance. Thus, in the example described here, details which are far away on the horizon and therefore very small are not requested by the client. With each type of detail is associated a max distance, which does not depend on its size alone. For example, pylons on the horizon are never requested, but forests always are.

In the same way, the function Chng( ) can take account of the fact that the user is in the process of moving the camera so as to adapt the priorities. Hereinafter, a few examples of processings which can be managed by the function Chng( ).

After each movement or zoom requested by the user, the Web interpreter sorts the requests so as to process by priority the operations in connection with what is closest to the center of the screen since this is where the user is looking.

When the user moves the map, the operations of requests may have their priority changed:
certain operations may be deactivated, for example by not processing the lowest priority lists by the manager (in the example of property described above, single, for example one now asks only for the locations of the property or premises (List 0) and optionally the map background (List 1),
the manager asks the server for the tiles of lower level of detail (therefore exhibiting a more synthetic content) than it would ask for when the map is immobile, but for use at the higher size: this allows quicker loading and therefore increases fluidity, and even if the displayed map is less precise and therefore less sharp, the motion will mean that the user will not notice it,
the requests for tiles for which no data have yet been received have their priority increased with respect to the tiles for which data are already available but in a lower level of detail than the level requested,
any operation which relates to something which is no longer visible to the user is canceled, and therefore deleted from the prioritization list.

Moreover, a displayed tile will be retained in cache, until the center of the map is at a chosen distance from this tile (for example 10 km).

The processing operations can also have their priority changed:
when the map moves, the manager decreases the time allotted to the generation of details and buildings, which will thus appear later without causing jerkiness in the motion,
if the manager determines that the device is not powerful enough to carry out all the processings, certain objects can be selectively deactivated, such as decorative objects (texture and animation of the water of watercourses, etc.),
the processings of the face data block data can be accorded priority over the processings of the texture data for their dispatch to the hardware calculation resources.

Other variants will be apparent on reading the claims which follow.

The invention claimed is:
1. An interactive device, comprising
a user interface to define at least one display request comprising at least location data and display data,
a network interface to issue a Web page data request in correspondence with the at least one display request,
a memory for receiving corresponding Web page data, the Web page data comprising mapping data and/or object data, and
a Web interpreter to display a Web page, the Web interpreter comprising a three-dimensional engine to calculate the display data in three dimensions based on the object data, a display engine to display the corresponding Web page data based on the mapping data and/or on the calculated display data in three dimensions, and a manager to determine a list comprising at least one operation, the at least one operation being a data request for object data and/or for mapping data or a processing request by the three-dimensional engine or the display engine for display of data received, the manager operating via a plurality of execution cycles and executing the at least one operation or operations of the determined list during a duration of a respective execution cycle as a function of an order of the operations in the determined list, of a number of requests in progress, and of the duration of the respective execution cycle, wherein the manager executes the data request when the number of data requests currently executing is less than a threshold number of data requests, and the manager determines between the execution of two operations whether a duration between the current time and the time of the next execution cycle is greater than a threshold temporal value, and ceases to run through the list of operations when the duration is less than the threshold temporal value.

2. The device of claim 1, wherein the manager executes the operations according to their order in the list.

3. The device of claim 1, wherein the manager executes the data request operation before the processing request operation.

4. The device of claim 1, wherein the manager determines a plurality of lists exhibiting a priority rank, and executes the operations of the plurality of lists by decreasing priority rank.

5. The device of claim 4, wherein the manager executes the operations of a list of lower priority rank when all the processing operations of a list of immediately higher priority rank have been executed.

6. A non-transitory computer readable medium having instructions stored thereon which, when executed by a processor, causes the processor to carry out the steps of:

defining at least one display request comprising at least location data and display data;

issuing a Web page data request in correspondence with the at least one display request;

receiving corresponding Web page data, the Web page data comprising mapping data and/or object data; and displaying a Web page, by
calculating the display data in three dimensions based on the object data,
displaying the corresponding Web page data based on the mapping data and/or of the calculated display data in three dimensions,
determining a list comprising at least one operation, the at least one operation being a data request for object data and/or for mapping data or a processing request for display of data received,
executing the at least one operation or operations of the determined list during a duration of an execution cycle as a function of an order of the operations in the determined list, of a number of requests in progress, and of the duration of the execution cycle,
executing the data request when the number of data requests currently executing is less than a threshold number of data requests, and
determining between the execution of two operations whether a duration between the current time and the time of the next execution cycle is greater than a threshold temporal value, and ceasing to run through the list of operations when the duration is less than the threshold temporal value.

7. A system comprising:

a server; and a processor in communication with the server, the processor:

defining at least one display request comprising at least location data and display data;

transmitting a Web page data request in correspondence with the at least one display request to the server;

receiving, from the server, corresponding Web page data, the Web page data comprising mapping data and/or object data; and displaying a Web page, by
calculating the display data in three dimensions based on the object data,
displaying the corresponding Web page data based on the mapping data and/or of the calculated display data in three dimensions,
determining a list comprising at least one operation, the at least one operation being a data request for object data and/or for mapping data or a processing request for display of data received,
executing the at least one operation or operations of the determined list during a duration of an execution cycle as a function of an order of the operations in the determined list, of a number of requests in progress, and of the duration of the execution cycle,
executing the data request when the number of data requests currently executing is less than a threshold number of data requests, and
determining between the execution of two operations whether a duration between the current time and the time of the next execution cycle is greater than a threshold temporal value, and ceasing to run through the list of operations when the duration is less than the threshold temporal value.

* * * * *